W. H. BITTMAN.
DENTAL HANDPIECE MIRROR.
APPLICATION FILED NOV. 21, 1913.

1,086,887.

Patented Feb. 10, 1914.

Witnesses
L. Lee.
J. Walter Greenbowz.

Inventor
Walter H. Bittman, per
Thomas S. Crane, Atty

UNITED STATES PATENT OFFICE.

WALTER H. BITTMAN, OF PHILADELPHIA, PENNSYLVANIA.

DENTAL HANDPIECE-MIRROR.

1,086,887. Specification of Letters Patent. Patented Feb. 10, 1914.

Application filed November 21, 1913. Serial No. 802,210.

*To all whom it may concern:*

Be it known that I, WALTER H. BITTMAN, a citizen of the United States, residing at University of Pennsylvania Dormitories, Philadelphia, county of Philadelphia, and State of Pennsylvania, have invented certain new and useful Improvements in Dental Handpiece-Mirrors, fully described and represented in the following specification and the accompanying drawings, forming a part of the same.

The present invention relates to a mirror for use with dental engine hand-pieces, and constructed with an aperture to pass over the tool and engage a collar or other fastening device upon the hand-piece.

The invention is especially adapted for use upon a right-angle hand-piece for a dental-engine, as the plane of the mirror in such case lies parallel with the handle of the hand-piece, which enables the operator to see the reflection therein when performing many operations.

The invention consists broadly of a reflector with a metallic shell fitted to its back and provided with means for securing it upon the hand piece, and the mirror and shell having an aperture to pass over the tool and through which tools may be inserted in and removed from the chuck of the hand piece. The mirror is preferably formed with spring clamps adapted to detachably grip a collar upon the hand-piece, and is thus made removable from the hand-piece when its use is not desired.

The invention will be understood by reference to the annexed drawings, in which—

Figure 1:
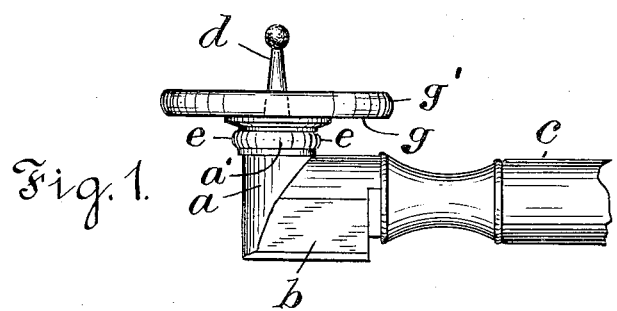
Figure 2:
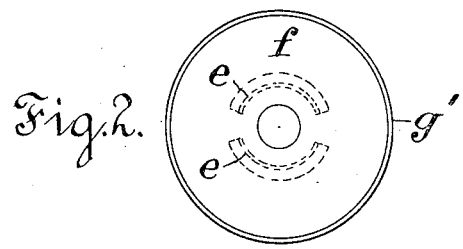

Figure 1 is a side elevation of the hand-piece provided with the improvement; Fig. 2 is a plan of the mirror, and Fig. 3 a central section of the mirror and the means of attaching it to the hand-piece.

The hand-piece is shown with head of elbow-shape having right-angle members $a$ and $b$ made in one piece the latter connected with the supporting-handle $c$ by which the operator manipulates the hand-piece, and the former carrying the geared sleeve $d$ which is constructed to grip the tool inserted therein, and forms a rotating chuck. A bur $d'$ is shown held in the sleeve. The member $a$ in which the sleeve revolves, has a collar $a'$ to which the mirror is secured by a spring clamp.

Figure 3:
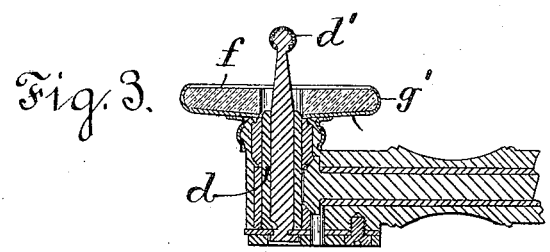

The mirror is shown held by a metallic shell $g$ bent over its edge $g'$ to grip it firmly. The clamps $e$ as shown in Figs. 2 and 3, are of segmental shape, secured to the shell $g$, and made of thin spring metal shaped so as to spring over the collar $e$ and hold the mirror detachably thereon.

The shape of the mirror is immaterial and the form of its reflecting surface provided it is of circular or annular form to fit around the tool upon the angle-hand-piece.

The essential feature of the invention is the attachment of a mirror to the hand-piece with a perforation through the mirror by which a tool can be inserted in and removed from the hand-piece with the mirror in place.

It is preferable that the mirror should be detachable from the hand-piece, as its use would only be required in certain operations, and it is immaterial how the mirror is detachably connected with the hand-piece.

The mirror is especially useful to a dentist when operating upon teeth in the upper jaw, and may be attached to the hand-piece during such operations and removed at other times; but I do not limit myself to any particular use of the mirror.

Having thus set forth the nature of the invention, what is claimed herein is —

1. The combination, with the angle hand-piece of a dental engine having a revolving tool, of a perforated mirror secured upon such hand-piece around the said tool.

2. An attachment for the angle hand-piece of a dental engine having a revolving tool, consisting of a mirror perforated to fit removably over the hand-tool, and means for clamping the mirror detachably to the hand-piece.

3. An attachment for the angle hand-piece of a dental engine having a revolving tool, consisting of an annular mirror, an annular metallic shell fitted to the back and edge of such mirror, and opposed elastic jaws upon the back of the shell adapted to detachably embrace a collar upon the hand-piece surrounding the tool.

In testimony whereof I have hereunto set my hand in the presence of two subscribing witnesses.

WALTER H. BITTMAN.

Witnesses:
G. E. NITZSCHE,
E. A. WELDEN.

Copies of this patent may be obtained for five cents each, by addressing the "Commissioner of Patents, Washington, D. C."